US007380007B1

(12) United States Patent
Bu et al.

(10) Patent No.: US 7,380,007 B1
(45) Date of Patent: May 27, 2008

(54) AUTOMATIC USER SESSION

(75) Inventors: Zhaoxi Bu, Great Falls, VA (US); Daniel T. McCrystal, Free Union, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 1402 days.

(21) Appl. No.: 09/842,025

(22) Filed: Apr. 26, 2001

Related U.S. Application Data

(60) Provisional application No. 60/215,083, filed on Jun. 30, 2000.

(51) Int. Cl.
*G06F 15/16* (2006.01)

(52) U.S. Cl. .................................. 709/227; 709/219

(58) Field of Classification Search ................ 709/204, 709/206, 227, 228, 229, 250, 202, 207, 224, 709/232, 219; 707/3, 201, 205; 705/5, 25; 713/100, 201, 155; 345/733, 760, 780; 379/88, 202; 725/132; 370/328
See application file for complete search history.

(56) References Cited

U.S. PATENT DOCUMENTS

| | | | |
|---|---|---|---|
| 5,325,361 A * | 6/1994 | Lederer et al. ............. 370/401 |
| 5,721,906 A | 2/1998 | Siefert ........................... 707/9 |
| 5,754,775 A * | 5/1998 | Adamson et al. ........... 709/204 |
| 5,758,126 A * | 5/1998 | Daniels et al. .............. 345/780 |
| 5,774,551 A * | 6/1998 | Wu et al. .................... 713/155 |
| 5,793,365 A | 8/1998 | Tang et al. .................. 345/758 |
| 5,796,393 A * | 8/1998 | MacNaughton et al. .... 345/733 |
| 5,842,176 A * | 11/1998 | Hunt et al. ...................... 705/5 |
| 5,878,219 A | 3/1999 | Vance, Jr. et al. ........... 709/217 |
| 5,950,172 A * | 9/1999 | Klingman ..................... 705/26 |
| 5,951,643 A | 9/1999 | Shelton et al. .............. 709/227 |
| 5,951,652 A | 9/1999 | Ingrassia, Jr. et al. ...... 709/248 |
| 5,954,798 A | 9/1999 | Shelton et al. .............. 709/224 |
| 5,983,273 A * | 11/1999 | White et al. ................. 709/229 |
| 6,014,502 A * | 1/2000 | Moraes ........................ 709/219 |
| 6,026,429 A | 2/2000 | Jones et al. .................. 709/201 |
| 6,058,399 A * | 5/2000 | Morag et al. ................ 707/201 |
| 6,088,728 A * | 7/2000 | Bellemore et al. .......... 709/227 |
| 6,115,755 A * | 9/2000 | Krishan ....................... 709/250 |
| 6,166,730 A | 12/2000 | Goode et al. ................ 345/716 |
| 6,170,017 B1 * | 1/2001 | Dias et al. ................... 709/235 |
| 6,182,144 B1 * | 1/2001 | England ....................... 709/232 |
| 6,278,532 B1 * | 8/2001 | Heimendinger et al. .... 358/442 |
| 6,278,993 B1 * | 8/2001 | Kumar et al. ................... 707/3 |

(Continued)

FOREIGN PATENT DOCUMENTS

WO     WO 97/46955     12/1997

OTHER PUBLICATIONS

"AOL technology: turning complicated things into engaging services", 1996 Annual Report, 22 pages.

*Primary Examiner*—Andrew Caldwell
*Assistant Examiner*—Douglas Blair
(74) *Attorney, Agent, or Firm*—Fish & Richardson P.C.

(57) ABSTRACT

Systems and techniques for retrieving electronic data by establishing a connection to the communications system using a first account of the user; initiating a first communication session over the connection associated with the first account of the user; and automatically initiating over the same connection one or more additional communication sessions associated with one or more additional accounts of the user.

37 Claims, 9 Drawing Sheets

U.S. PATENT DOCUMENTS

| | | | |
|---|---|---|---|
| 6,301,609 B1 * | 10/2001 | Aravamudan et al. | 709/207 |
| 6,341,160 B2 * | 1/2002 | Tverskoy et al. | 379/88.13 |
| 6,418,214 B1 * | 7/2002 | Smythe et al. | 379/202.01 |
| 6,438,597 B1 * | 8/2002 | Mosberger et al. | 709/227 |
| 6,457,879 B1 * | 10/2002 | Thurlow et al. | 709/206 |
| 6,484,196 B1 * | 11/2002 | Maurille | 709/206 |
| 6,486,892 B1 * | 11/2002 | Stern | 345/760 |
| 6,496,936 B1 * | 12/2002 | French et al. | 713/201 |
| 6,505,230 B1 * | 1/2003 | Mohan et al. | 709/202 |
| 6,560,704 B2 * | 5/2003 | Dieterman et al. | 713/100 |
| 6,564,327 B1 * | 5/2003 | Klensin et al. | 726/7 |
| 6,571,259 B1 * | 5/2003 | Zheng et al. | 707/205 |
| 6,571,290 B2 * | 5/2003 | Selgas et al. | 709/228 |
| 6,618,858 B1 * | 9/2003 | Gautier | 725/132 |
| 6,654,735 B1 * | 11/2003 | Eichstaedt et al. | 707/3 |
| 6,697,864 B1 * | 2/2004 | Demirtjis et al. | 709/229 |
| 6,757,706 B1 * | 6/2004 | Dong et al. | 709/203 |
| 6,842,782 B1 * | 1/2005 | Malik et al. | 709/224 |
| 6,854,009 B1 * | 2/2005 | Hughes | 709/220 |
| 6,874,023 B1 * | 3/2005 | Pennell et al. | 709/224 |
| 6,876,974 B1 * | 4/2005 | Marsh et al. | 705/14 |
| 6,879,965 B2 * | 4/2005 | Fung et al. | 705/39 |
| 6,895,584 B1 * | 5/2005 | Belkin | 718/100 |
| 6,954,782 B2 * | 10/2005 | Thurlow et al. | 709/206 |
| 7,069,249 B2 * | 6/2006 | Stolfo et al. | 705/74 |
| 2001/0025256 A1 * | 9/2001 | Oliphant et al. | 705/26 |
| 2001/0042010 A1 * | 11/2001 | Hassell | 705/14 |
| 2002/0054579 A1 * | 5/2002 | Miloslavsky | 370/328 |
| 2002/0091774 A1 * | 7/2002 | Imamura et al. | 709/206 |
| 2002/0130904 A1 * | 9/2002 | Becker et al. | 345/753 |
| 2002/0133491 A1 * | 9/2002 | Sim et al. | 707/10 |
| 2002/0198951 A1 * | 12/2002 | Thurlow et al. | 709/206 |
| 2003/0097331 A1 * | 5/2003 | Cohen | 705/39 |
| 2005/0044423 A1 * | 2/2005 | Mellmer et al. | 713/201 |
| 2007/0250584 A1 * | 10/2007 | Weyer et al. | 709/206 |

\* cited by examiner

900

Select Screen Names

| Screen Name | Password |
|---|---|
| ☐ Screen Name | ☐ |
| ☐ Screen Name | ☐ |
| ☐ Screen Name | ☐ |
| ☐ Screen Name | ☐ |

905

Note: Storing your passwords does not change them. To change your passwords, please go to Keyword: PASSWORD when you're online.

[OK] [Cancel]

Run Automatic AOL Now

Select "Begin" below to immediately run Automatic AOL for the screen name you are using now. The actions that you have specified will occur. If you would like to review or change your instructions, select "Set Session" instead ☐ Sign Off When Finished

[Begin] [Set Session] [Cancel]

AUTOMATIC USER SESSION

This application claims the benefit of U.S. Provisional Application No. 60/215,083 filed Jun. 30, 2000, which is incorporated by reference.

TECHNICAL FIELD

The present invention relates generally to retrieving electronic data. More particularly, the present invention relates to retrieving electronic data during a communication session with an online service provider.

BACKGROUND

Online service providers are constantly offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from repositories located throughout the world. A server may be maintained by the service provider or by a third party provider who makes information and services available through the network of computers that make up the online service.

One important consideration for subscribers is the ease at which the information and services of an online service provider are accessed. Congestion during peak hours may prevent subscribers from accessing the online service and may cause subscriber dissatisfaction.

Another important consideration for subscribers is minimizing time spent performing online activities. For example, some online service providers may charge subscribers for accessing information and services, such that efficient use of time translates into cost savings.

America Online has facilitated access to information and reduced time spent online by allowing subscribers to go online to automatically access and retrieve information that then may be considered offline. After using this feature to quickly and automatically access designated information, subscribers have the ability to read and respond to e-mail offline, read and respond to newsgroup or message board postings offline, and download collected files offline. This automatic access feature reduces the capacity requirements of an online service provider and also may reduce charges to subscribers for time spent online. Furthermore, subscribers can designate the times to go online, such as during off-peak hours, to increase the likelihood of successfully connecting to the online service.

SUMMARY

Users who have more than one screen name may make use of an automatic access feature for all screen names using a single physical connection. This is in contrast to requiring a separate physical connection for each screen name, or to requiring a user to manually initiate the automatic access feature for one screen name, manually switch to a different screen name, and then manually initiate the automatic access feature for the different screen name.

In one general aspect, electronic data is retrieved by establishing a connection to the communications system using a first account of a user, initiating a first communication session over the connection associated with the first account of the user, and automatically initiating over the same connection one or more additional communication sessions associated with one or more additional accounts of the user.

Implementations may include one or more of the following features. For example, electronic data associated with the first account of the user and/or the one or more additional accounts of the user may be accessed. Accessing electronic data may include, for example, retrieving e-mail, sending e-mail, downloading one or more files, retrieving messages posted to a message board, and/or posting messages to a message board.

Automatically initiating one or more additional communication sessions may include automatically switching between the different screen names of a user. Preferences may be set for initiating each of the communication sessions. For example, a user may set the times at which the communications sessions are initiated. A user also may set the same or different preferences for each communication session and/or each screen name.

The first communication session may be initiated automatically and/or run in parallel with the additional communication sessions. The user may be a single person or a group of related people.

Implementations may apply an apparatus and/or a computer program stored on a computer readable medium. The computer readable medium may be a disc, a client device, a host device, and/or a propagated signal.

Other features and advantages will be apparent from the following description, including the drawings, and from the claims.

DESCRIPTION OF DRAWINGS

FIGS. 7-10 are illustrations of different graphical user interfaces that may be provided by the system of FIG. 1.

DETAILED DESCRIPTION

For illustrative purposes, FIGS. 1-5 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
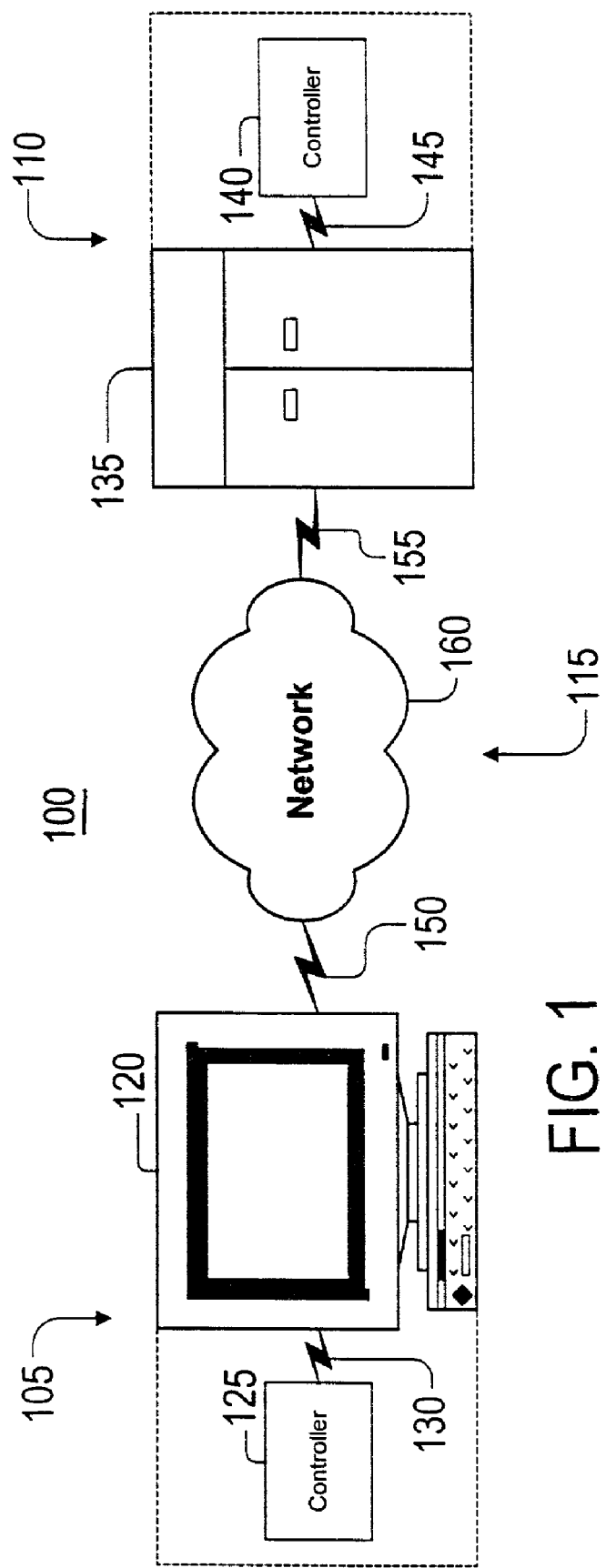
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
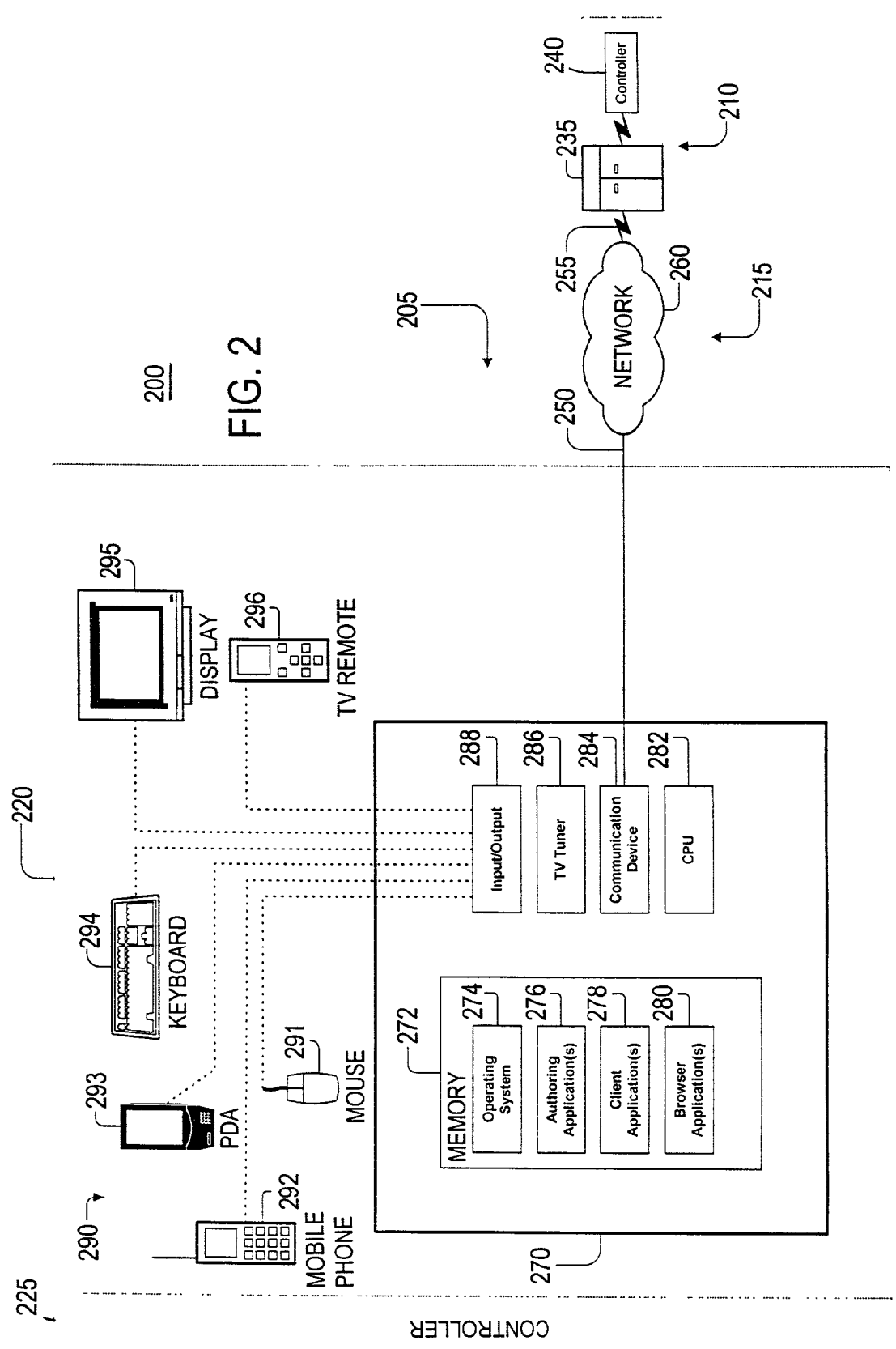
FIGS. 2-5 are block diagrams of expansions of aspects of the system of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and an audiovisual device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
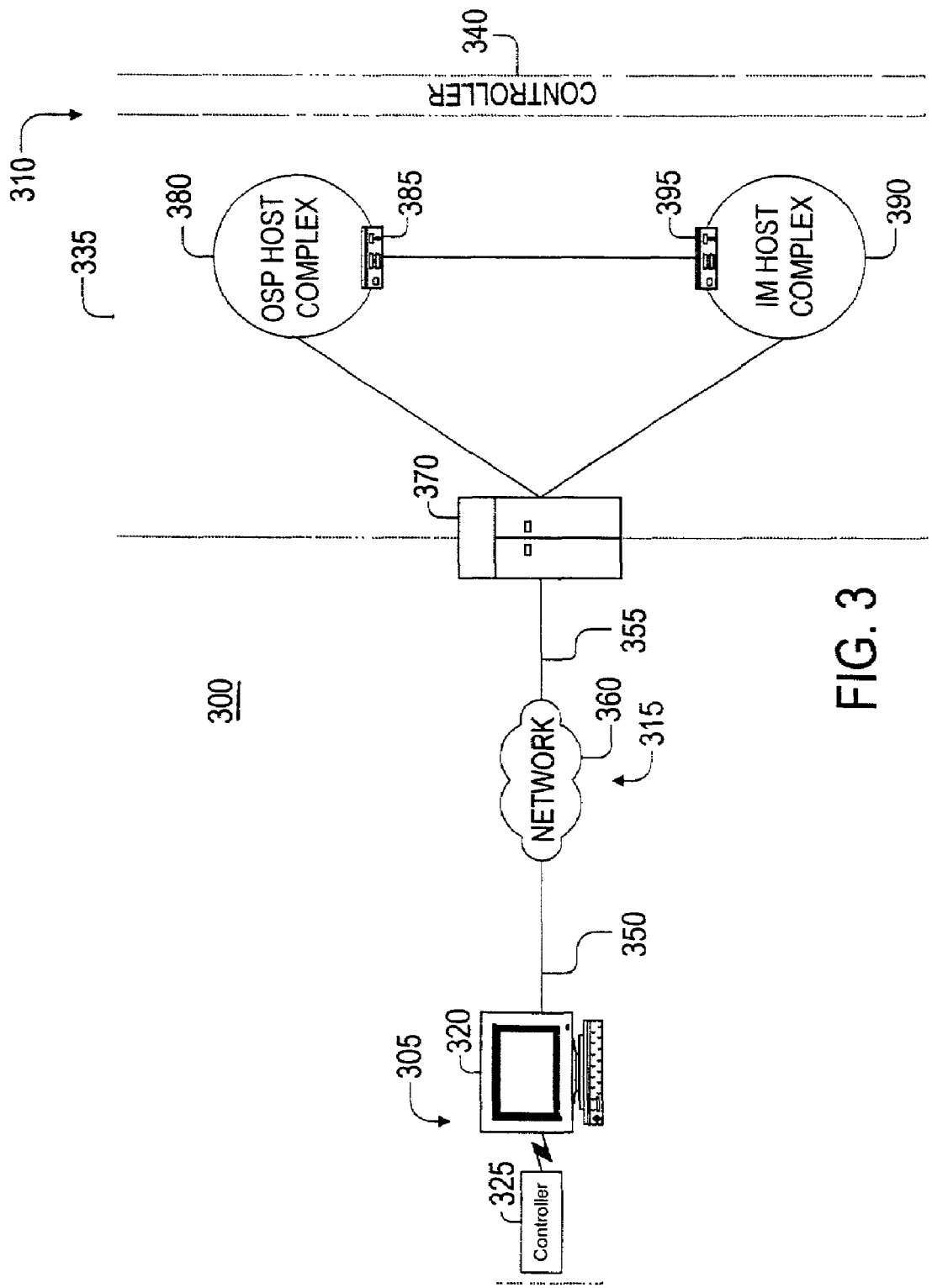

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
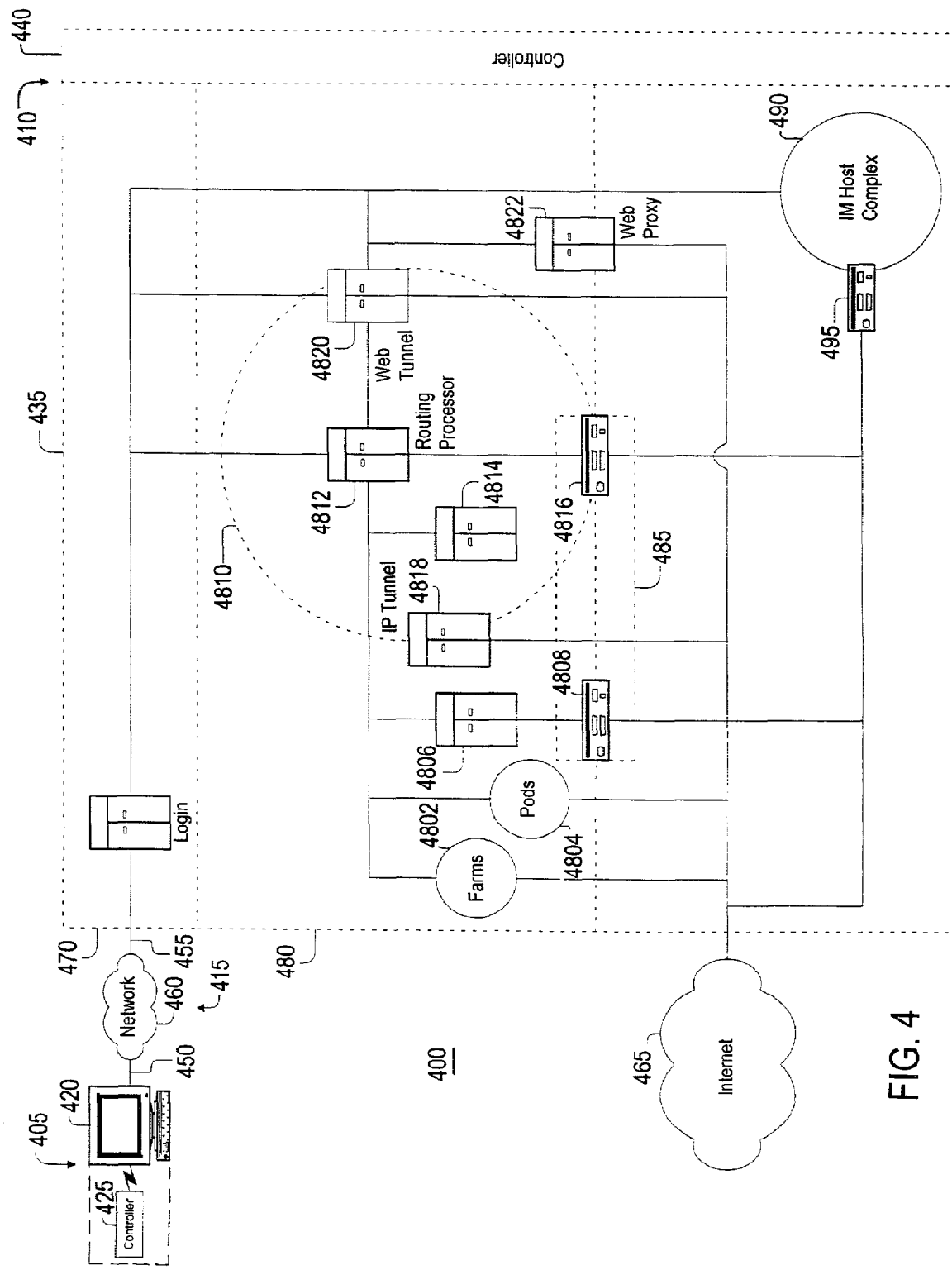

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IN host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465 through. The proxy server 4802 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
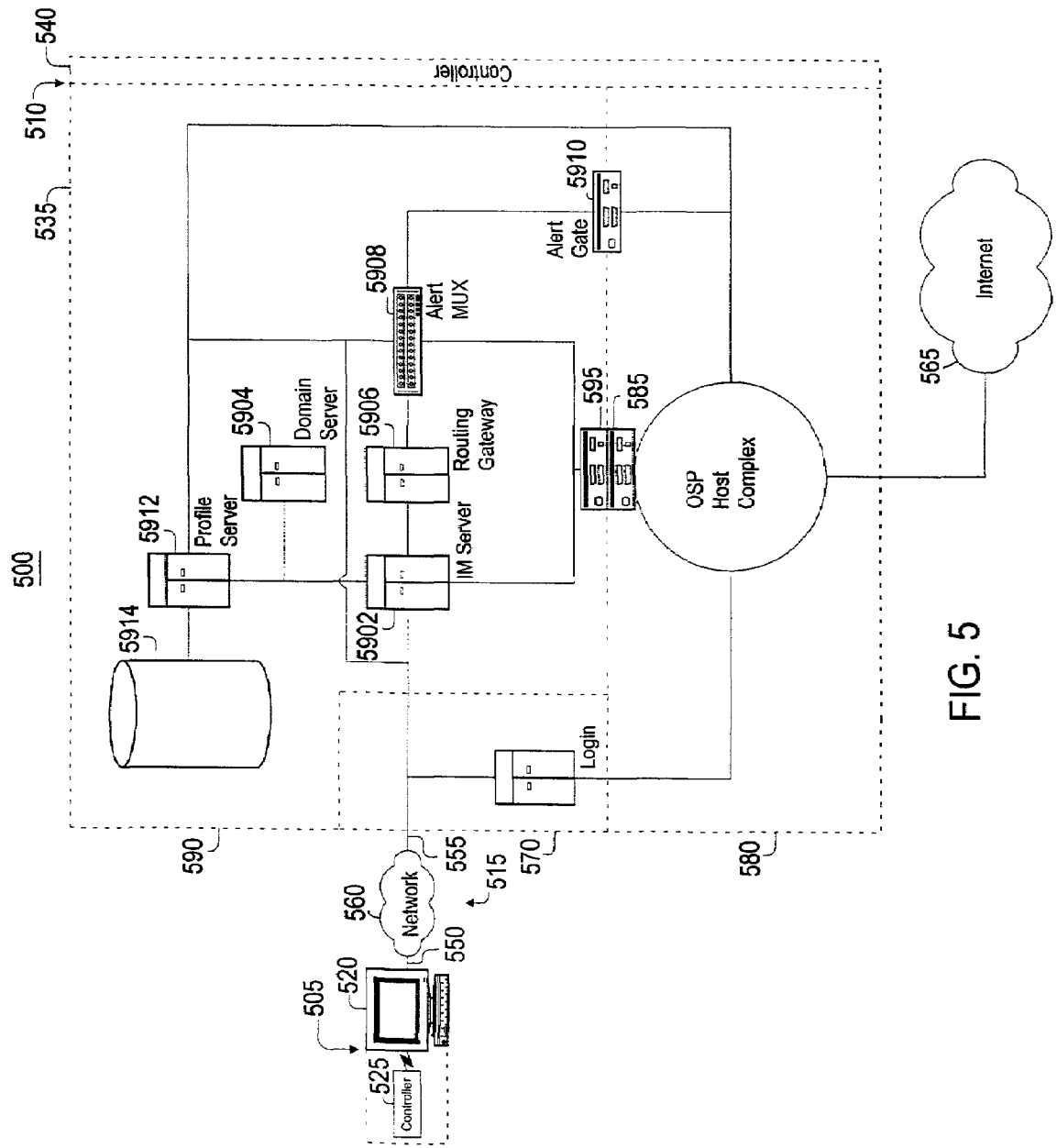

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
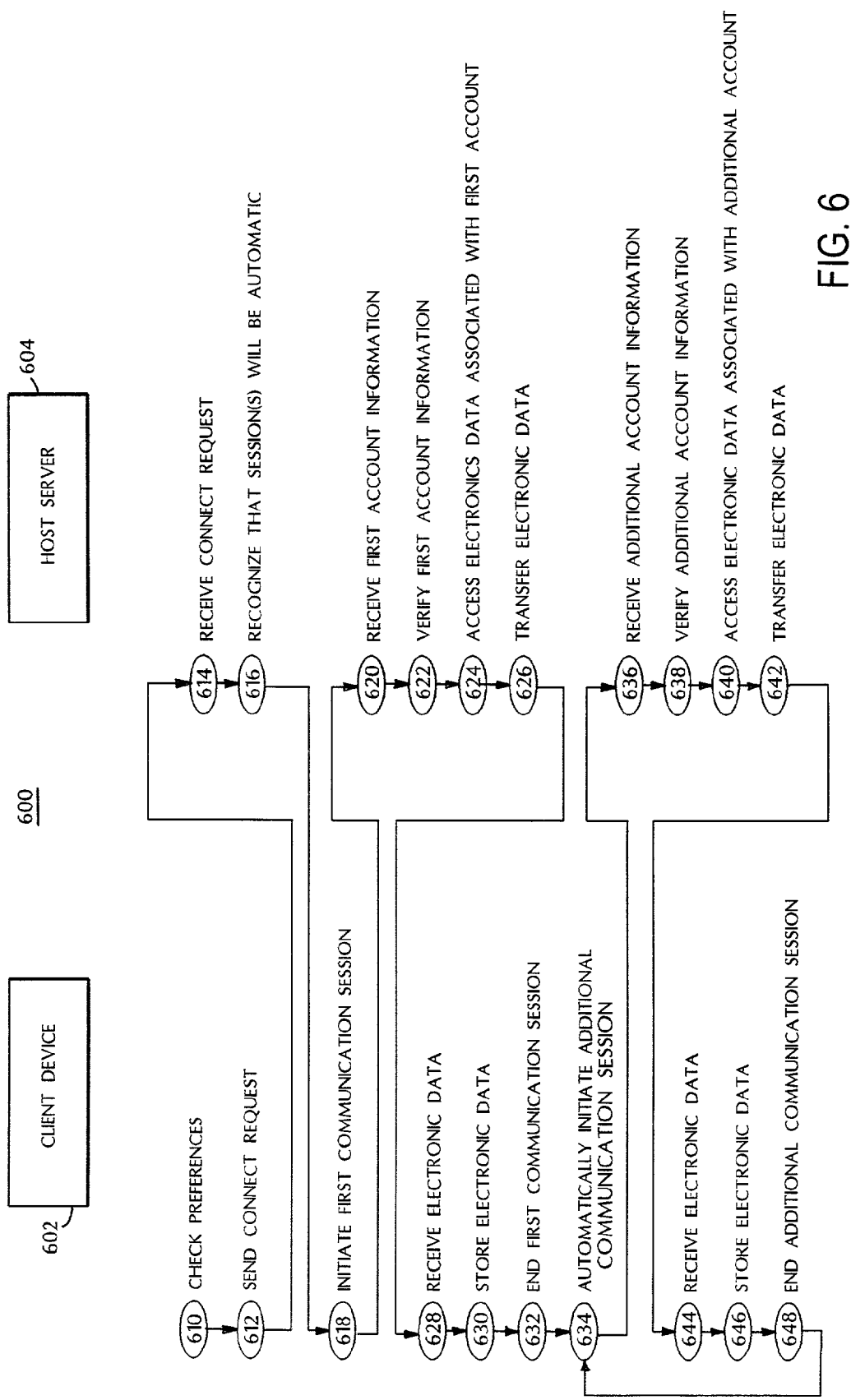
FIG. 6 is a flow chart of a communications method that may be implemented by the system of FIG. 1.

Referring to FIG. 6, a client device 602 and a host server 604 in the OSP host complex interact according to a procedure 600 to retrieve electronic data. The procedure 600 may be implemented by any type of hardware, software, device, computer, computer system, equipment, component, program, application, code, storage medium, or propagated signal.

Examples of each element of FIG. 6 are broadly described above with respects to FIGS. 1-5. In particular, the client 602 typically has attributes comparable to those described with respect to client devices 120, 220, 320, 420 and 520 and/or client controllers 125, 225, 325, 425 and 525. The host 604 typically has attributes comparable to those described above with respect to host devices 135, 235, 335, 435 and 535 and/or host controllers 140, 240, 340, 440 and 540. The client 602 and the host 604 may be directly or indirectly interconnected through a known or described delivery network.

Initially, the client 602 checks preferences previously set by a user associated with the client 602 (step 610). The preferences that may be set by a user include, but are not limited to, electronic data access preferences and scheduling preferences. By setting electronic data access preferences, a user can automatically send e-mail written offline, retrieve unread e-mail, download files that are attached to unread e-mail, post messages written offline to newsgroups and/or message boards, retrieve unread postings to newsgroups and/or message boards, and download any files waiting to be downloaded. By setting scheduling preferences, a user may designate the times at which to automatically access the online service. In this way, a user does not have to be present at a computer to access the online service. Alternatively, the user can select immediate initiation of an automatic access session.

If the preferences indicate that an automatic session should occur, the client 602 sends a connect request to the host 604 (step 612). The host 604 receives the connect request (step 614) and recognizes that the client 602 is requesting an automatic access session (step 616). During a regular session, as opposed to an automatic access session, the client 602 may receive software updates and current data from the host 604. The updating process is complex and involves numerous servers within the host 604. During an automatic access session, however, the host 604 postpones the transmission of any software updates and current data due to the brevity of the automatic access session.

The client 602 then initiates the first communication session (step 618). The first communication session may be initiated manually by the user and/or automatically according to the user's electronic data access preferences. In general, the client 602 will transmit account information, such as, for example, screen names, passwords, and preferences. The host 604 receives the first account information (step 620) and verifies that the first account information corresponds to a user of the online service (step 622).

After authorizing entry to the online service, the host 604 accesses electronic data associated with the first account of the user (step 624). In general, access will be performed in accordance with the user's electronic data access preferences. The host 604 may access electronic data from other parts of the host complex and/or the client 602. For example, the host 604 may retrieve any unread e-mail, newsgroup or message board postings, and downloadable files corresponding to the first account from other parts of the host 604. In addition, the host 604 may retrieve e-mail messages and newsgroup and/or message board postings written offline by the user from the client 602.

After accessing the designated electronic data associated with the first account (step 624), the host 604 transfers the electronic data to the designated destinations (step 626). In one implementation, the host 604 transfers unread e-mail and newsgroup and/or message board postings to the client 602 and transfers e-mail and newsgroup and/or message board postings written offline to other parts of the host 604.

The client 602 receives electronic data from the host 604 (step 628) and stores the electronic data (step 630). The client 602 may store electronic data in a folder specifically designated for the account's automatic access session. After all the designated actions mandated by the user's electronic data access preferences have been performed, the client 602 ends the first communication session (step 632).

While maintaining the same physical connection to the host 604, the client 602 automatically initiates one or more additional communication sessions (step 634). The host 604 receives additional account information from the client 602 (step 636) and verifies that the additional account information corresponds to the user (step 638). The host 604 then accesses electronic data associated with the additional accounts (step 640). Typically, access is performed in accordance with the user's electronic data access preferences.

After accessing the designated electronic data, the host 604 transfers the electronic data to the designated destinations (step 642). The host 604 may transfer the electronic data to the client 602 and/or other servers in the host 604. The client 602 receives the electronic data (step 644) and stores the electronic data (step 646). The client 602 typically will store the electronic data in a folder designated specifically for the additional account's automatic access session.

After all the designated actions are performed for the additional account, the client 602 ends the additional communication session (step 648). The client 602 then automatically initiates another communication session until a communication session has been initiated for all designated accounts of the subscriber.

In one implementation, the client 602 automatically initiates additional communication sessions successively for each screen name of the subscriber. In another implementation, the client device 602 runs the first communication session and the one or more additional communication sessions in parallel. That is, all the sessions are run simultaneously over the same physical connection with the host 604.

Figure 7:
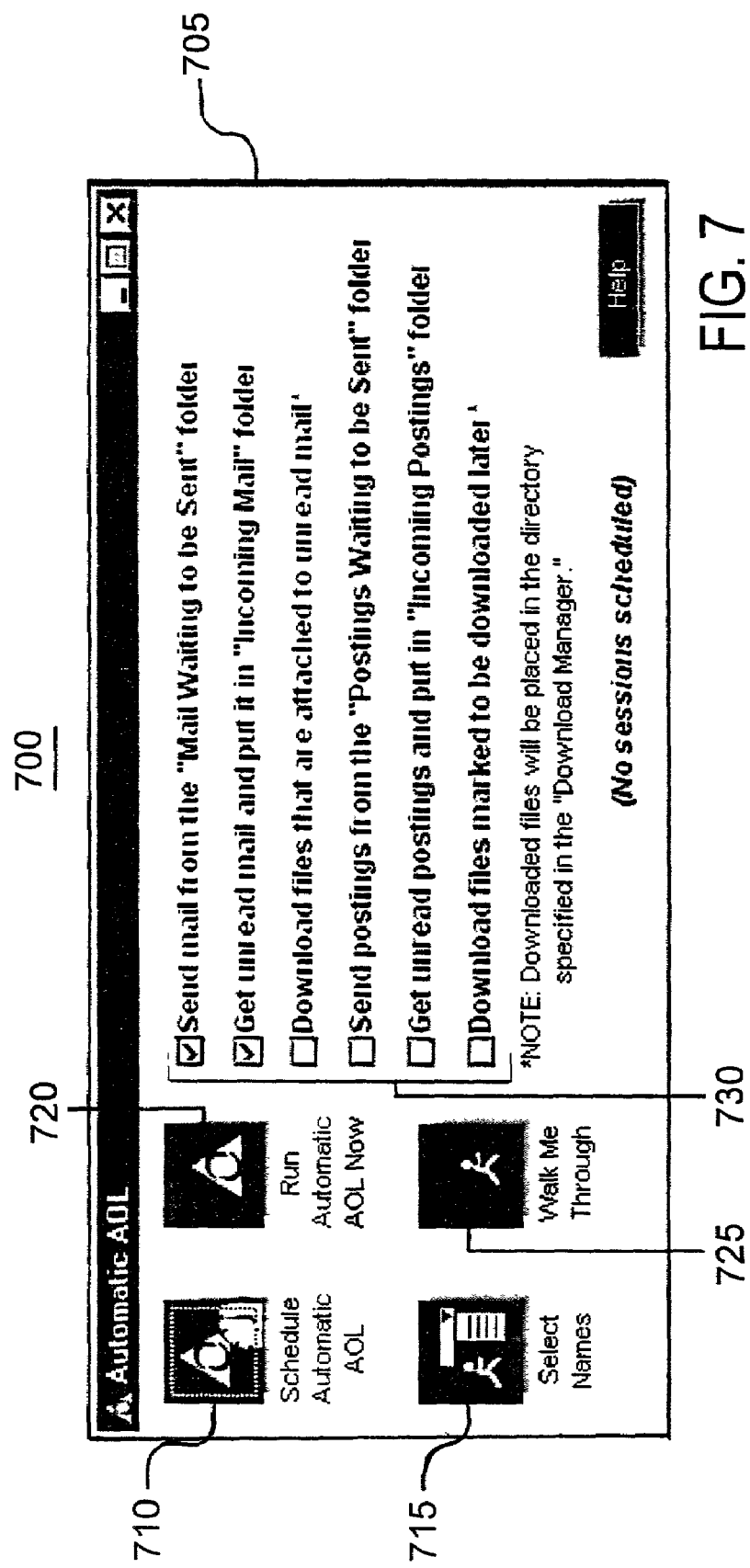

Referring to FIG. 7, a user interface 700 includes an Automatic AOL template 705 for setting subscriber preferences. The Automatic AOL template 705 includes a Schedule Automatic AOL button 710, a Select Names button 715, a Run Automatic AOL Now button 720, and a Walk Me Through button 725. The schedule automatic AOL button 710 brings up a template for setting timing preferences. The select names button 715 brings up a template for designating the screen names for which automatic access sessions will be performed. The Run Automatic AOL Now button 720 immediately initiates an automatic access session. The Walk Me Through button 725 brings up a tutorial for providing more detailed information about the automatic access feature.

The Automatic AOL template 705 also includes electronic access preference boxes 730 for setting preferences such as sending e-mail written offline or postponed e-mail, retrieving unread e-mail, downloading files that are attached to unread e-mail, sending postings written offline to newsgroups and/or message boards, retrieving unread postings from newsgroups and/or message boards and downloading files which were previously postponed.

Figure 8:
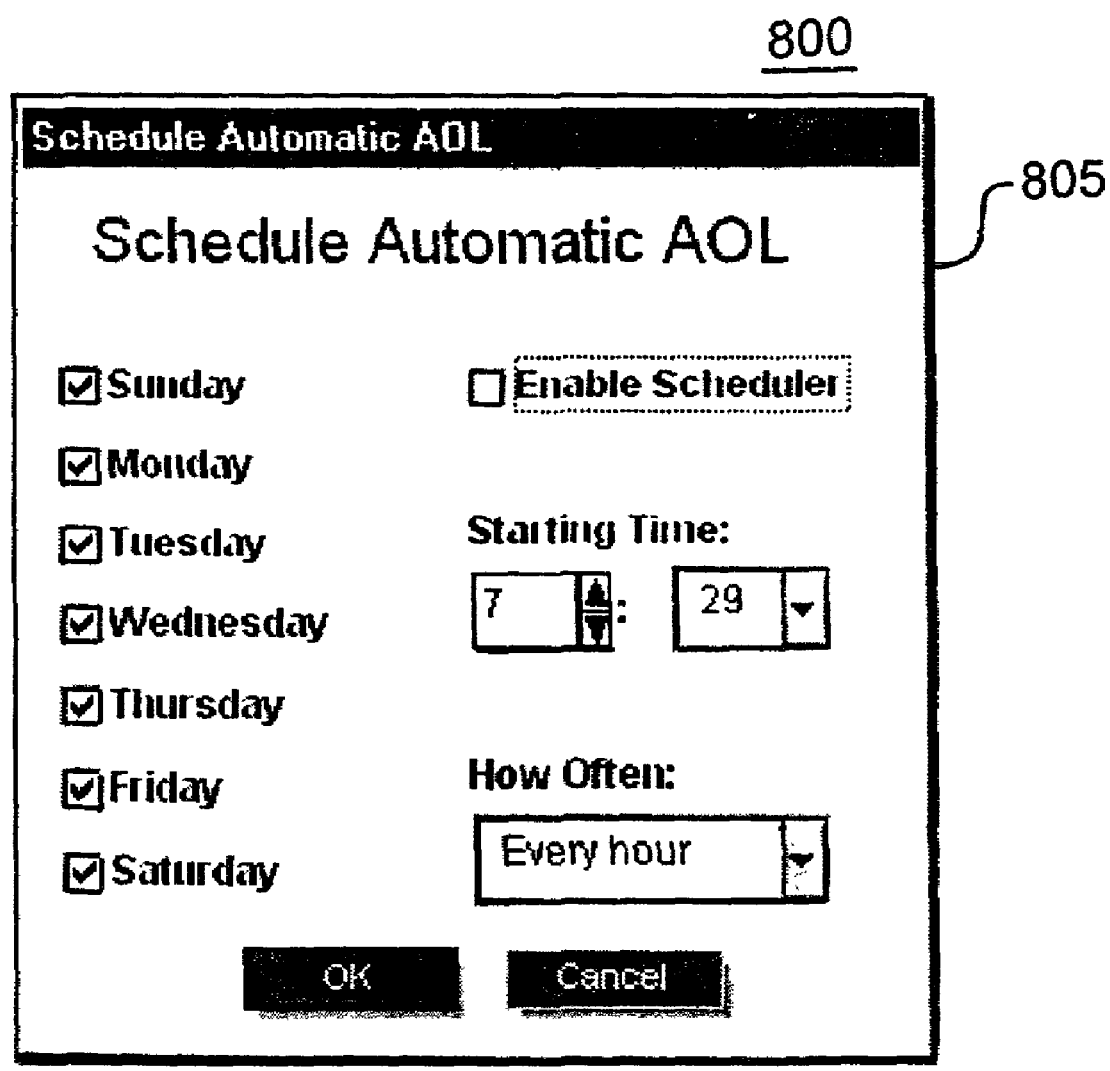

Referring to FIG. 8, a user interface 800 includes a Schedule Automatic AOL template 805. Using the Schedule Automatic AOL template 805, a subscriber can set the times at which to initiate an automatic access session. For example, a subscriber can designate the days, the starting time, and the frequency at which to initiate automatic access sessions.

Referring to FIG. 9, a user interface 900 includes a Select Screen Names template 905. Using the Select Screen Names template 905, a subscriber can designate the screen names for which the automatic access sessions are to be performed. The subscriber also furnishes the password for each screen name so that the account(s) of the subscriber can be authenticated.

Referring to FIG. 10, a user interface 1000 includes a Run Automatic AOL now button 1005. Using the Run Automatic AOL now button, a subscriber can immediately initiate an automatic access session. The subscriber also can select whether to sign off when the automatic access session has been completed.

The foregoing description and examples are intended to illustrate and not limit the scope of the invention, which is defined by the appended claims. In particular, the general aspects relating to accessing a communications system are applicable to accessing a communications device, as well. For example, a user can automatically initiate several communications sessions between a first communications device (e.g., cell phone, notebook computer, PDA) and a second communications device (e.g., PC, desktop computer, workstation) over a single connection to upload and download information associated with multiple accounts of the user.

Other implementations are within the scope of the following claims.

What is claimed is:

1. A method of accessing electronic data from a communications system, the method comprising:
    establishing a connection between a client system and a host system using a first account of a user, the first account of the user being maintained by the host system;
    determining if one or more additional accounts maintained by the host system are associated with the user;
    initiating a first communication session between the client system and the host system over the connection, the first communication session being associated with the first account of the user;
    based on a determination that one or more additional accounts maintained by the host system are associated with the user, automatically initiating, over the same connection between the client system and the host system, one or more additional communication sessions between the client system and the host system, the one or more additional communication sessions being associated with the one or more additional accounts associated with the user;
    transmitting, to the host system, additional account information for the one or more additional accounts maintained by the host system; and
    after transmitting the additional account information for the one or more additional accounts to the host system, enabling, for each of the one or more additional accounts, a transfer of electronic data associated with each of the one or more additional accounts to a corresponding designated destination in response to automatically initiating the one or more additional communication sessions between the client system and the host system.

2. The method of claim 1 further comprising accessing electronic data associated with the first account of the user.

3. The method of claim 1 wherein enabling the transfer of electronic data comprises retrieving e-mail.

4. The method of claim 1 wherein enabling the transfer of electronic data comprises sending e-mail.

5. The method of claim 1 wherein enabling the transfer of electronic data comprises downloading one or more files.

6. The method of claim 1 wherein enabling the transfer of electronic data comprises retrieving messages posted on a message board.

7. The method of claim 1 wherein enabling the transfer of electronic data comprises posting messages to a message board.

8. The method of claim 1 wherein the first account and the one or more additional accounts comprise different screen names.

9. The method of claim 8 wherein automatically initiating one or more additional communication sessions comprises automatically switching between the different screen names.

10. The method of claim 1 further comprising setting preferences for initiating the first communication session.

11. The method of claim 10 wherein setting preferences comprises scheduling a time to initiate the first communication session.

12. The method of claim 1 further comprising setting preferences for initiating the one or more additional communication sessions.

13. The method of claim 12 wherein setting preferences comprises scheduling a time to automatically initiate the one or more additional communications session.

14. The method of claim 1 further comprising setting different preferences for initiating the first communication session and for initiating the one or more additional communication sessions.

15. The method of claim 1 wherein the first communication session is initiated automatically.

16. The method of claim 1 further comprising running the first communication session and the one or more additional communication sessions in parallel.

17. The method of claim 1 wherein the user comprises a single member of an online service.

18. The method of claim 1 wherein the user comprises multiple members of the online service.

19. The method of claim 18 wherein the multiple members are related.

20. The method of claim 1 wherein automatically initiating comprises automatically initiating, over the same connection to the host system, the one or more additional communication sessions associated with the one or more additional accounts in response to a preference set by the user prior to initiation of the one or more additional communication sessions.

21. The method of claim 1 wherein establishing the connection between a the client system and the host system and initiating a first communication session between the client system and the host system over the connection occur automatically and without user manipulation.

22. The method of claim 1 wherein automatically initiating, over the same connection between the client system and the host system, one or more additional communication sessions between the client system and the host system, occurs automatically and without user manipulation.

23. The method of claim 1 further comprising automatically synchronizing data related to the first account or the one or more additional accounts wherein, prior to synchronization, the data related to the first account or the one or more additional accounts was stored on only one of the client system or the host system.

24. The method of claim 23 wherein automatically synchronizing data comprises one or of sending an e-mail message written using the client system when the client system was not connected to the host system, retrieving from the host system an unread e-mail message, posting a massage to a newsgroup or message board that was written using the client system when the client system was not connected to the host system, and retrieving from the host system a message to a newsgroup or message board.

25. The method of claim 23 wherein automatically synchronizing data comprises automatically synchronizing data related to each of several accounts associated with the user.

26. The method of claim 1 wherein;
the host system is a network access service provider that provides network access service to enable the user to access systems other than the host system,
the first account corresponds to a first e-mail account of the user provided by the host system, and
one of the one or more additional accounts corresponds to an additional e-mail account provided by the host system.

27. The method of claim 1 wherein:
the host system is a network access service provider that provides network access service to enable the user to access systems other than the host system,
the first account corresponds to a first screen name for an instant messaging service provided by the host system, and
one of the one or more additional accounts corresponds to an additional screen name for the instant messaging service provided by the host system.

28. The method of claim 1 wherein:
the host system is a network access service provider that provides network access service to enable the user to access systems other than the host system,
one of the first account or at least one of the one or more additional accounts corresponds to a screen name for an instant messaging service provided by the host system, and other of the first account or the at least one of the one or more additional accounts correspond to an e-mail account provided by the host system.

29. The method of claim 1 wherein automatically initiating, over the same connection between the client system and the host system, one or more additional communication sessions between the client system and the host system comprises automatically initiating at least one of the one or more additional communication sessions when the user is not present at the client system.

30. The method of claim 1 wherein enabling, for each of the one or more additional accounts, a transfer of electronic data associated with each of the one or more additional accounts to a corresponding designated destination includes enabling, for each of the one or more additional accounts, a transfer of electronic data associated with each of the one or more additional accounts to a corresponding designated destination based on verification of the additional account information for each of the one or more additional accounts maintained by the host system.

31. A computer program product embodied in a tangible computer-readable storage medium, the computer program product including instructions that, when executed, cause a computer to:
establish a connection between a client system and a host system using a first account of a user, the first account of the user being maintained by the host system;
determine if one or more additional accounts maintained by the host system are associated with the user;
initiate a first communication session between the client system and the host system over the connection, the first communication session being associated with the first account of the user;
based on a determination that one or more additional accounts maintained by the host system are associated with the user, automatically initiate, over the same connection between the client system and to the host system, one or more additional communication sessions between the client system and the host system, the one or more additional communication sessions being associated with the one or more additional accounts associated with the user;
transmit, to the host system, additional account information for the one or more additional accounts maintained by the host system; and
for each of the one or more additional accounts, enable a transfer of electronic data associated with each of the one or more additional accounts to a corresponding designated destination in response to automatically initiating the one or more additional communication sessions between the client system and the host system and after transmitting additional account information for the one or more additional accounts to the host system.

32. The computer program product of claim 31 further comprising instructions that, when executed, cause the computer to:
access e-mail data.

33. The computer program product of claim 31 further comprising instructions that, when executed, cause the computer to:
download one or more files.

34. The computer program product of claim 31 wherein the first account and the one or more additional accounts comprise different screen names.

35. The computer program product of claim 31 wherein the instructions that, when executed, cause a computer to enable, for each of the one or more additional accounts, a transfer of electronic data associated with each of the one or more additional accounts to a corresponding designated destination include instructions that, when executed, cause a computer to enable, for each of the one or more additional accounts, a transfer of electronic data associated with each of the one or more additional accounts to a corresponding designated destination based on verification of the additional account information for each of the one or more additional accounts maintained by the host system.

36. A communications apparatus for accessing electronic data from a communications system, the apparatus being configured to:

establish a connection between a client system and a host system using a first account of a user, the first account of the user being maintained by the host system;

determine if one or more additional accounts maintained by the host system are associated with the user;

initiate a first communication session between the client system and the host system over the connection, the first communication session being associated with the first account of the user;

based on a determination that one or more additional accounts maintained by the host system are associated with the user, automatically initiate, over the same connection between the client system and the host system, one or more additional communication sessions between the client system and the host system, the one or more additional communication sessions being associated with the one or more additional accounts associated with the user; and transmit, to the host system, additional account information for the one or more additional accounts maintained by the host system; and for each of the one or more additional accounts, enable a transfer of electronic data associated with each of the one or more additional accounts to a designated destination in response to automatically initiating the one or more additional communication sessions between the client system and the host system and after transmitting additional account information for the one or more additional accounts to the host system.

37. The communications apparatus of claim 36 wherein the apparatus is configured to enable, for each of the one or more additional accounts, a transfer of electronic data associated with each of the one or more additional accounts to a designated destination based on verification of the additional account information for each of the one or more additional accounts maintained by the host system.

* * * * *